(12) United States Patent
Pommeret et al.

(10) Patent No.: US 7,172,322 B2
(45) Date of Patent: Feb. 6, 2007

(54) FRAMING FOR A WINDOW OF A MOTOR VEHICLE PASSENGER COMPARTMENT, AND A MOTOR VEHICLE DOOR INCLUDING SUCH FRAMING

(75) Inventors: Maelig Pommeret, Oyannax (FR); Stephanie Ader, Nantua (FR)

(73) Assignee: Compagnie Plastic Omnium, Lyon (FR)

( * ) Notice: Subject to any disclaimer, the term of this patent is extended or adjusted under 35 U.S.C. 154(b) by 1 day.

(21) Appl. No.: 10/617,758

(22) Filed: Jul. 14, 2003

(65) Prior Publication Data

US 2004/0105274 A1 Jun. 3, 2004

Related U.S. Application Data

(63) Continuation of application No. 10/080,548, filed on Feb. 25, 2002, now abandoned.

(30) Foreign Application Priority Data

Feb. 26, 2001 (FR) ................................. 01 02597

(51) Int. Cl.
*B60Q 1/26* (2006.01)

(52) U.S. Cl. ................. 362/503; 362/267; 362/540; 362/544

(58) Field of Classification Search ............... 362/504, 362/541, 540, 544, 267, 549, 503
See application file for complete search history.

(56) References Cited

U.S. PATENT DOCUMENTS

| | | | |
|---|---|---|---|
| 2,139,420 A * | 12/1938 | Richards | 362/549 |
| 3,932,971 A | 1/1976 | Day | |
| 4,051,631 A | 10/1977 | Jones, III | |
| 4,139,234 A | 2/1979 | Morgan | |
| 4,240,227 A | 12/1980 | Hasler et al. | |
| 4,373,153 A | 2/1983 | Sano et al. | |
| 4,426,028 A | 1/1984 | Bott | |
| 4,488,141 A * | 12/1984 | Ohlenforst et al. | 362/541 |
| 4,758,931 A * | 7/1988 | Gabaldon | 362/503 |
| 4,821,158 A * | 4/1989 | Mitten | 362/249 |
| 4,896,136 A * | 1/1990 | Hotovy | 340/468 |
| 4,912,607 A * | 3/1990 | Kocsi et al. | 362/492 |
| 4,954,808 A | 9/1990 | Duerkob | |
| 4,984,144 A | 1/1991 | Cobb et al. | |
| 5,016,145 A * | 5/1991 | Singleton | 362/503 |
| 5,211,466 A * | 5/1993 | Jarocki et al. | 362/540 |
| 5,255,165 A * | 10/1993 | Cail | 362/541 |
| 5,272,602 A | 12/1993 | Sasajima et al. | |

(Continued)

FOREIGN PATENT DOCUMENTS

DE 32 45 710 A1 11/1983

(Continued)

*Primary Examiner*—Sandra O'Shea
*Assistant Examiner*—Jacob Y. Choi
(74) *Attorney, Agent, or Firm*—Oliff & Berridge, PLC

(57) ABSTRACT

The invention related to framing (8) for the window of the passenger compartment of a motor vehicle, the framing having a support face between an inside edge (8a) and an outside edge (8b) of the framing and designed to be covered by the periphery of a window (6) connected in sealed manner to said outside edge. On its window-supporting face, the framing has an arrangement (15) for receiving a light source (12).

5 Claims, 5 Drawing Sheets

U.S. PATENT DOCUMENTS

| | | | |
|---|---|---|---|
| 5,325,807 A | 7/1994 | Hidekura | |
| 5,353,502 A | 10/1994 | Hattori et al. | |
| 5,400,225 A * | 3/1995 | Currie | 362/554 |
| 5,433,151 A | 7/1995 | Ohara et al. | |
| 5,454,193 A | 10/1995 | Hrifko | |
| 5,489,409 A | 2/1996 | Koganezawa et al. | |
| 5,505,023 A | 4/1996 | Gillen et al. | |
| 5,609,410 A | 3/1997 | Rives | |
| 5,610,472 A | 3/1997 | Schmitt, Jr. | |
| 5,628,557 A * | 5/1997 | Huang | 362/252 |
| 5,652,565 A | 7/1997 | Salcedas et al. | |
| 5,941,596 A | 8/1999 | See | |
| 6,030,105 A * | 2/2000 | Thau et al. | 362/488 |
| 6,086,230 A * | 7/2000 | Wooldridge et al. | 362/503 |
| 6,286,891 B1 | 9/2001 | Gage et al. | |
| 6,370,824 B1 | 4/2002 | Keeney et al. | |
| 6,386,617 B1 | 5/2002 | Kusuma et al. | |
| 6,536,930 B1 * | 3/2003 | Hirmer | 362/540 |

FOREIGN PATENT DOCUMENTS

| | | |
|---|---|---|
| DE | 44 27 402 A1 | 2/1996 |
| DE | 296 20 774 U1 | 3/1998 |
| DE | 197 06 043 A1 | 6/1998 |
| EP | 0 995 668 A1 | 4/2000 |
| FR | 2 715 908 | 8/1995 |

* cited by examiner

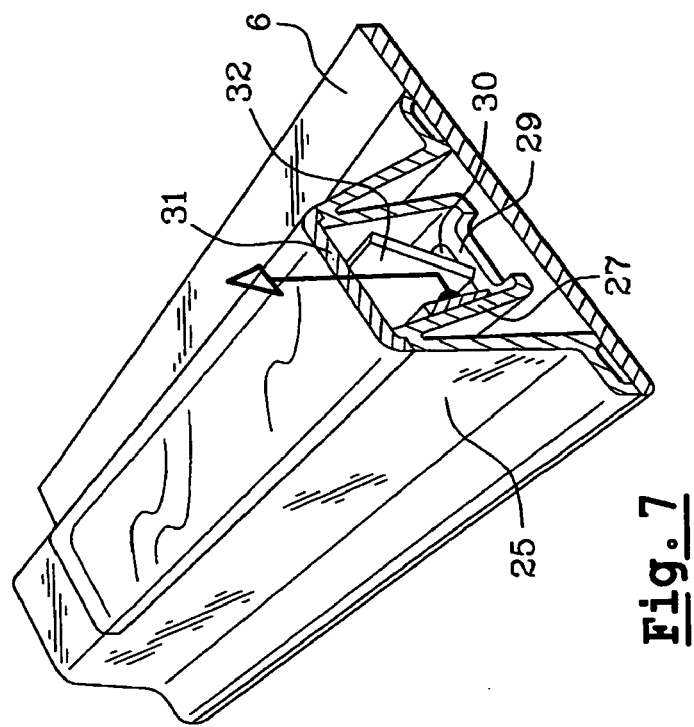
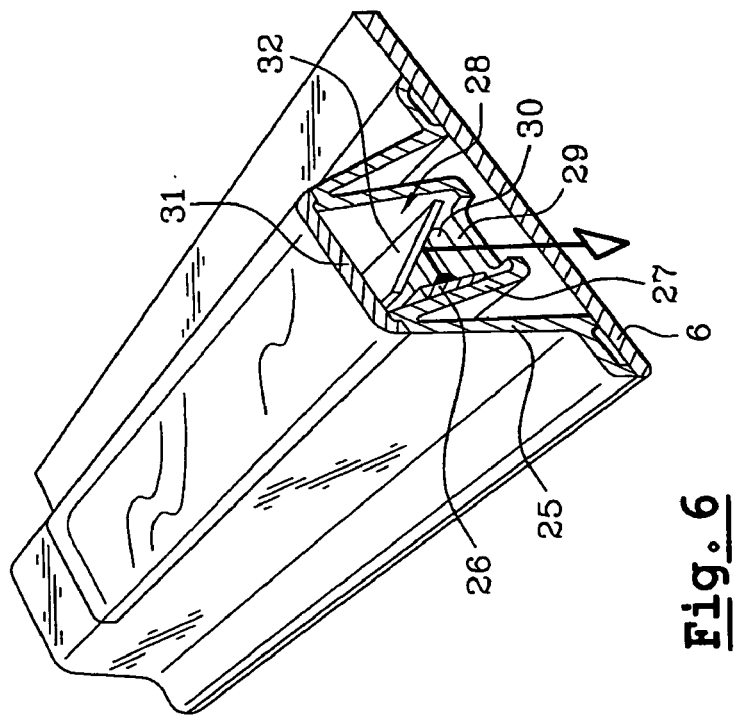

FRAMING FOR A WINDOW OF A MOTOR VEHICLE PASSENGER COMPARTMENT, AND A MOTOR VEHICLE DOOR INCLUDING SUCH FRAMING

This is a Continuation of application Ser. No. 10/080,548 filed Feb. 25, 2002 now abandoned. The entire disclosure of the prior application is hereby incorporated by reference herein in its entirety.

BACKGROUND

The present invention relates to framing for a window of the passenger compartment of a motor vehicle, and to a motor vehicle door including such framing.

It is known to make the rear lights of motor vehicles, and in particular the stop lights, by integrating them in air deflectors, also known as spoilers, which are placed to extend the roof or the trunk.

These deflectors then simultaneously constitute housings for the lights, which means there is no need to provide separate housings for the lights.

SUMMARY

One of the difficulties that arises with such pieces that perform both the function of a deflector and the function of a housing for lights, is that they must be watertight, which considerably increases cost.

Thus, the saving achieved by integrating the lights in the deflector is lost in part by the increase in cost for a deflector that is sealed.

The present invention seeks to propose a solution for integrating lights in a motor vehicle in a manner that does not require any increase in cost for the member that receives the lights.

The present invention provides framing for a window of a motor vehicle passenger compartment, the framing including a support face between an inside edge and an outside edge of the framing for being covered by the periphery of a window that is connected in sealed manner to said outside edge.

According to the invention, the framing is characterized in that it includes an arrangement on its window-supporting face for receiving a light source.

The invention of the present application takes advantage from the existence of the window of the passenger compartment and of its framing to form a light unit whose housing is constituted by the framing and whose glazing is constituted by the window.

Compared with prior techniques consisting in using an air deflector, the invention presents the advantage that the housing constituted by the framing is, by its very nature, a housing that is sealed from the outside of the vehicle.

In a particular embodiment, the framing is provided with a reinforced structure for stiffening it.

The passenger compartment window framing of the invention can be carried by a vehicle door, in particular a rear door or tailgate, which presents the advantage of providing a visible surface area near the top of the vehicle, i.e. in the most appropriate location for receiving stop lights or direction indicators.

In a particular embodiment, the framing includes a housing that is open both towards the outside of the vehicle, i.e. towards the window side, and towards the inside of the vehicle, this housing being arranged to receive the light source in such a manner as to enable it to emit light out from the housing both towards the outside and towards the inside of the vehicle.

In a preferred variant, the housing is closed, towards the inside of the vehicle, by a wall that is translucent or transparent, and possibly provided with a filter, so as to diffuse the light emitted by the light source towards the inside of the vehicle.

This wall allows light to pass from the light source housed in the framing so that the light source can emit light towards the outside of the vehicle through the passenger compartment window, and towards the inside of the vehicle through said wall.

In a particular embodiment, the housing contains a moving reflector capable of taking up a first position in which it sends light rays emitted by the light source towards the outside of the vehicle through the window, and a second position in which it sends the light rays towards the inside of the passenger compartment.

Framing provided with such a moving reflector can be used, for example, on a tailgate so as to act both as a rear light unit when the tailgate is in the closed position, and to illuminate the trunk of the vehicle when the tailgate is in the open position, with the moving reflector being moved between its two positions by opening and closing the tailgate.

The invention also provides a motor vehicle door, in particular a tailgate, characterized in that it includes framing as described above.

BRIEF DESCRIPTION OF THE DRAWINGS

In order to make the invention easier to understand, embodiments are described below with reference to the accompanying drawings, in which:

FIG. 6 is a fragmentary section view analogous to FIG. 4 showing a tailgate upright in another embodiment; and FIG. 7 is a view analogous to FIG. 6 showing the upright in another position.

DETAILED DESCRIPTION OF EMBODIMENTS

Figure 1:
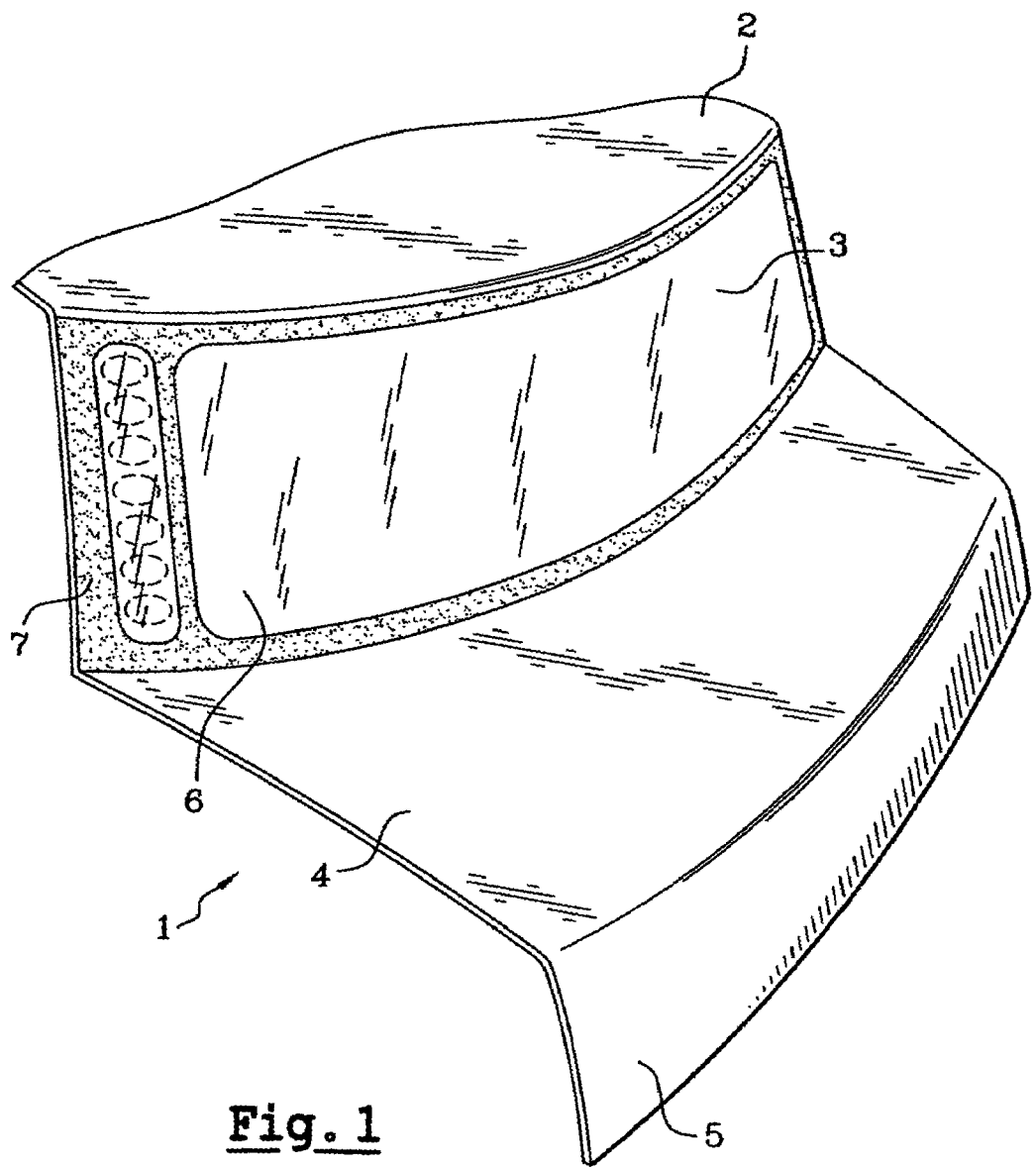
FIG. 1 is a perspective view of a tailgate of a motor vehicle.

The tailgate 1 of a vehicle as shown in FIG. 1 comprises a top portion 2 extending the vehicle roof (not shown), a vertical glazed portion 3, a substantially horizontal intermediate portion 4 covering the rear trunk of the vehicle, and a substantially vertical end portion 5 starting the body shell waistline at the back of the vehicle.

The glazed portion 3 is constituted by a window 6 having a black margin 7 made by silkscreen printing to hide the framing structure of the tailgate.

Figure 2:
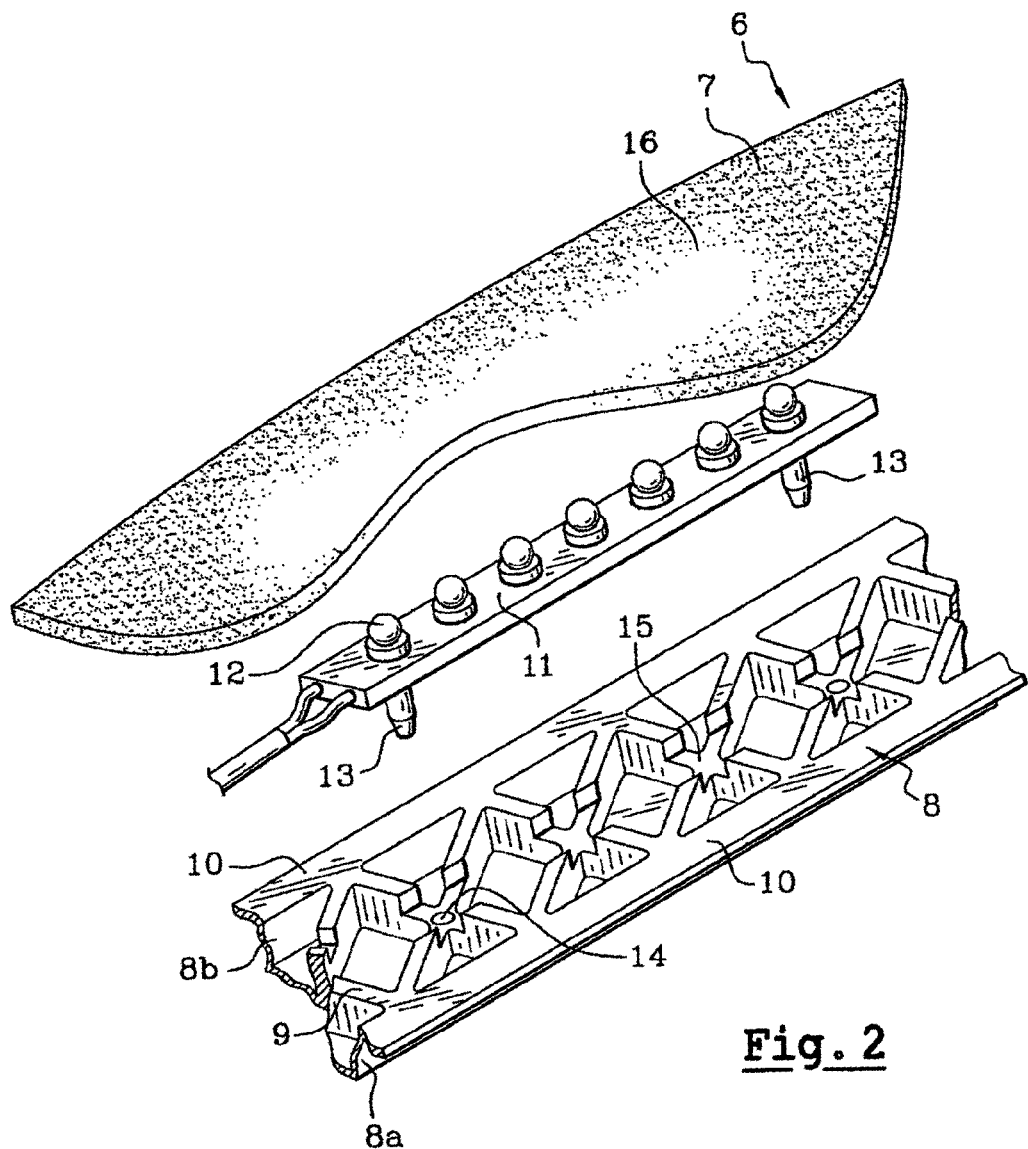
FIG. 2 is a close-up view of one of the uprights of the FIG. 1 vehicle tailgate.

This structure is constituted by uprights 8, one of which is visible in FIG. 2.

In the embodiment of FIG. 2, each upright 8 is constituted by a structural part forming a box fitted with an internal array of ribs 9. The box has an inside edge 8a and an outside edge 8b.

The box extends longitudinally and is of channel section. It has two side plates 10 whereby it is stuck to the window, thus serving simultaneously to hold the window and to seal the box relative to the outside of the vehicle, with this being performed in particular by the side plate 10 adjacent to the outside edge 8b. These two soleplates coincide with the support face of the box that receives the window 6.

A longitudinal support plate 11 made of plastics material supports light-emitting diodes (LEDs) 12. The plate 11 is designed to be received in the box so as to position the LEDs therein.

For this purpose, the plate has fasteners in the form of pins 13 suitable for insertion into orifices 14 provided for this purpose in the box on its side facing towards the window.

The internal array of ribs has cutouts 15 for receiving the support plate 11.

The silkscreen printing 7 around the window defines a transparent strip on either side of the window in register with the LEDs carried by the support plate.

Given the long lifetime that LEDs are assumed to have, no means are provided in this embodiment for replacing them, since the lifetime of the tailgate (and thus of the vehicle) is assumed to be shorter than that of the LEDs.

Figure 3:
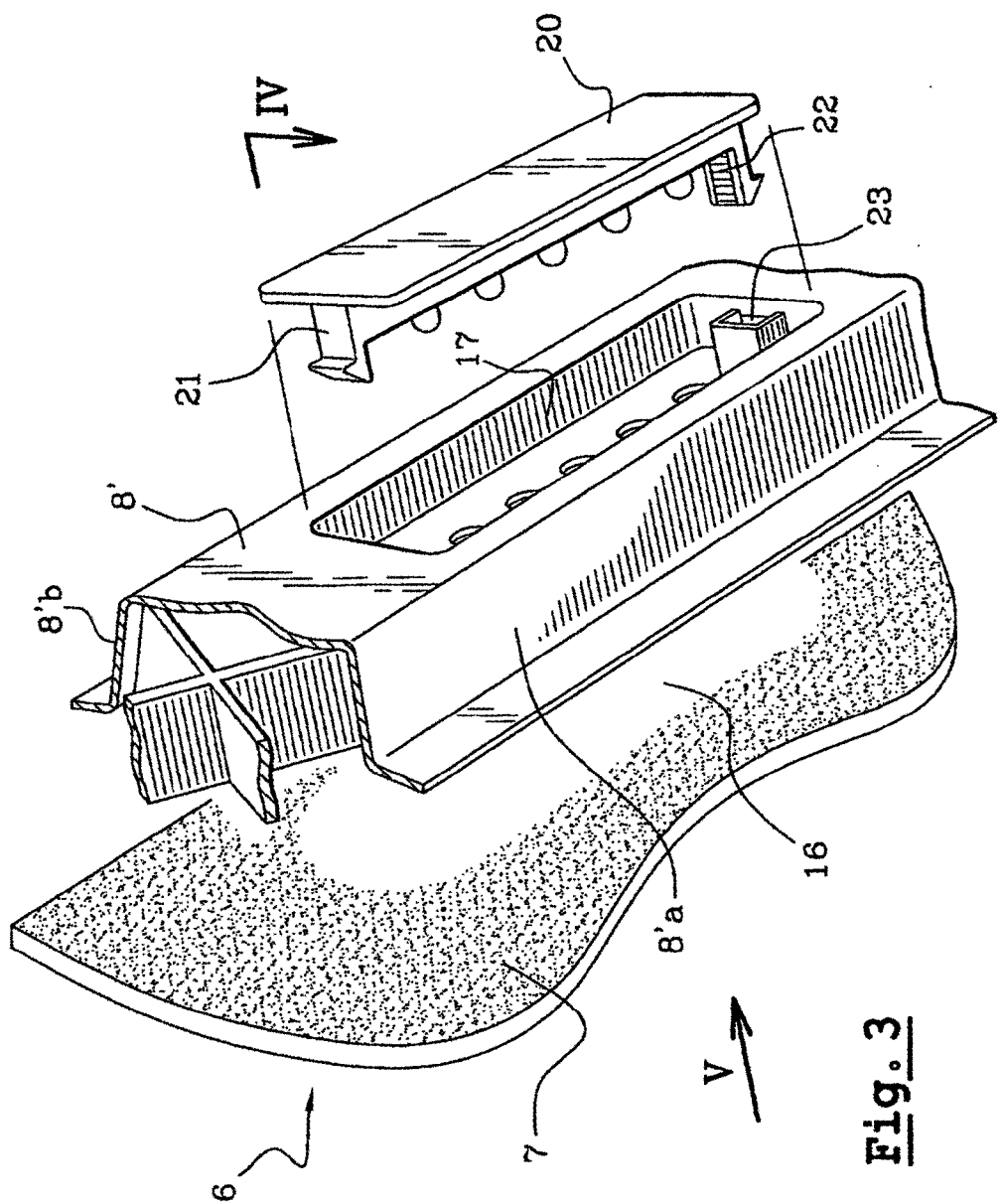
FIG. 3 is a close-up view of a tailgate upright in a different embodiment of the invention.
Figure 4:
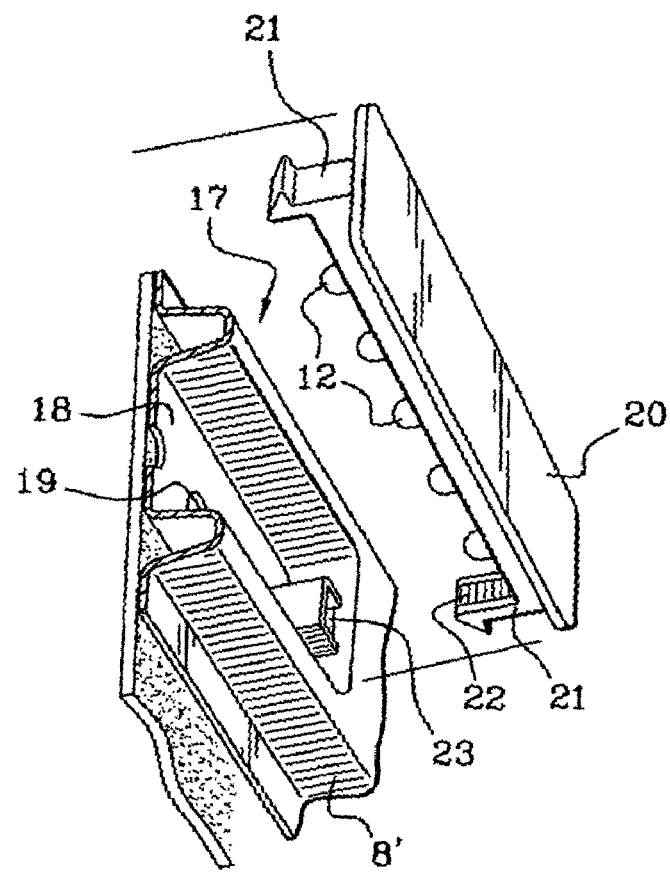
FIG. 4 is a fragmentary section view on IV—IV through the upright of FIG. 3.
Figure 5:
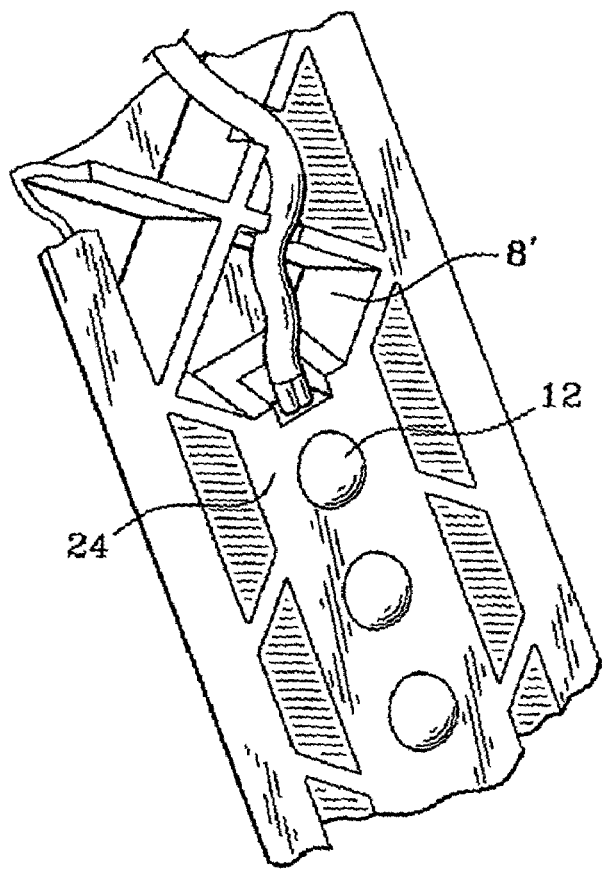
FIG. 5 is a view looking along V at the FIG. 3 upright.

In the embodiment of FIGS. 3, 4, and 5, the upright 8' of the tailgate presents a ribbed structure outside the zones for receiving the light sources 12 that is identical to the structure in the upright described above, having an inside edge 8'a and an outside edge 8'b.

In contrast, in the portions that are designed to receive the light sources, the upright has a housing 17 that is accessible from inside the vehicle. This housing is substantially in the form of a rectangular parallelepiped, having a far wall 18 provided with openings 19 positioned to coincide with the LEDs 12 carried by a support plate 20 in the form of a cover suitable for closing the housing.

The support plate 20 has resilient lugs or clips 21 for snap-fastening it in the housing. These lugs carry electrically conductive tracks 22 serving as electrical connectors for feeding electricity to the LEDs by coupling with a conductive base member 23 provided in the housing.

As can be seen in FIG. 4, the array of ribs in the upright is interrupted at the location of the housing for receiving the LEDs.

The advantage of this embodiment lies in the possibility of removing the LEDs easily, which can be useful in spite of the assumed long lifetime of LEDs, e.g. for the purpose of changing the power of these light sources or their colors.

As can be seen in FIG. 5, when the cover is properly positioned in the housing, the LEDs are flush with the face of the upright that is directed towards the window and thus in the immediate proximity of the window.

The face 23 of the upright surrounding the diodes can then be seen through the window and its appearance can be improved, e.g. by overmolding a decorative film while making the upright.

In the embodiment of FIGS. 6 and 7, the upright 25 is of a cross-section similar to that of the upright shown in FIGS. 3 to 5.

However, in this embodiment, the LEDs 26 are mounted on one of the side walls 27 of the housing 28 that is designed to receive the light sources.

The housing is closed by inside glazing 31 constituting a wall that is transparent or translucent. This inside glazing can include a filter for white light so as to diffuse white light towards the inside of the passenger compartment, even if the LEDs emit red light.

By means of the inside glazing 31 and also of openings 30 provided in the far wall of the housing, the light emitted by the LEDs 26 can leave the housing both towards the inside and towards the outside of the vehicle.

A pivoting reflector 32 is placed facing the diodes inside the housing. This reflector can take up a first position as shown in FIG. 6 where it directs the light rays from the LEDs 26 towards the outside through the openings 30 formed in the far wall 29 of the housing, as represented by the arrow in this figure.

The pivoting reflector 32 can also take up a second position as shown in FIG. 7, in which it sends the light rays emitted by the LEDs 26 towards the inside glazing 31, i.e. towards the inside of the passenger compartment, as represented by the arrow in this figure.

The pivoting reflector 32 can be switched between its two positions by any suitable means, for example by an electrical actuator (not shown).

Another way of moving the reflector 32 is to make use of its own weight. For this purpose, it suffices to fix the reflector on a pivot axis that is offset relative to its center of gravity. Thus, the reflector can take up the position shown in FIG. 6 when the tailgate is closed in which case the LEDs act as rear lights, and the position shown in FIG. 7 when the tailgate is open, in which case the LEDs serve to illuminate the trunk. The person skilled in the art can readily achieve such a configuration.

The embodiments described above are not limiting in any way, and the invention is defined by the accompanying claims.

In particular, light sources other than LEDs could be used, as could other structures for the uprights, providing the framing includes arrangements for receiving a light source.

What is claimed is:

1. A framing for a window of a motor vehicle passenger compartment, the framing including a support face between an inside edge and an outside edge of the framing for being covered by the window that is connected in a sealed manner to said outside edge, the framing including an arrangement on said support face for receiving a light source, and the framing also including a housing that is opened both towards an outside of the vehicle, and towards an inside of the vehicle, the housing being arranged to receive the light source in such a manner as to enable the light source to emit light out from the housing both towards the outside and towards the inside of the vehicle.

2. The framing according to claim 1, wherein the housing is closed, towards the inside of the vehicle, by a wall that is translucent or transparent so as to diffuse the light emitted by the light source towards the inside of the vehicle.

3. The framing according to claim 2, wherein the wall is provided with a filter.

4. A framing for a window of a motor vehicle passenger compartment, the framing including a support face between an inside edge and an outside edge of the framing for being covered by the window that is connected in a sealed manner to said outside edge, the framing including an arrangement on said support face for receiving a light source, and the framing also including a housing that is opened both towards an outside of the vehicle, and towards an inside of the vehicle, the housing being arranged to receive the light source in such a manner as to enable the light source to emit light out from the housing both towards the outside and towards the inside of the vehicle, wherein the housing contains a moving reflector capable of taking up a first position in which the reflector sends light rays emitted by the light source towards the outside of the vehicle through the window, and a second position in which the reflector sends the light rays towards the inside of the passenger compartment.

5. A motor vehicle tailgate comprising the framing according to claim 4, wherein the reflector takes up the first position when the tailgate is closed and the second position when the tailgate is open, the moving reflector being moved between two positions by opening and closing the tailgate.

* * * * *